(12) United States Patent
    Ono et al.

(10) Patent No.:    US 12,674,066 B2
(45) Date of Patent:        Jul. 7, 2026

(54) LAMINATE COMPRISING PLASTICIZER-CONTAINING LAYER AND INK LAYER, AND RADIATION-CURABLE INK

(71) Applicant: 3M INNOVATIVE PROPERTIES COMPANY, St. Paul, MN (US)

(72) Inventors: Katsuya Ono, Yamagata (JP); Bruce A. Nerad, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 101 days.

(21) Appl. No.: 18/038,612

(22) PCT Filed: Dec. 16, 2021

(86) PCT No.: PCT/IB2021/061857
    § 371 (c)(1),
    (2) Date: May 24, 2023

(87) PCT Pub. No.: WO2022/130278
    PCT Pub. Date: Jun. 23, 2022

(65) Prior Publication Data
    US 2024/0010856 A1      Jan. 11, 2024

(30) Foreign Application Priority Data

Dec. 18, 2020    (JP) ................................. 2020-210641

(51) Int. Cl.
    *B32B 3/10*          (2006.01)
    *C09D 11/101*        (2014.01)
    *C09D 11/107*        (2014.01)
    *C09D 11/54*         (2014.01)

(52) U.S. Cl.
    CPC .......... *C09D 11/101* (2013.01); *C09D 11/107* (2013.01); *C09D 11/54* (2013.01)

(58) Field of Classification Search
    None
    See application file for complete search history.

(56) References Cited

U.S. PATENT DOCUMENTS

| | | | |
|---|---|---|---|
| 6,228,543 B1 | 5/2001 | Mizuno et al. | |
| 6,534,128 B1 | 3/2003 | Carlson et al. | |
| 6,558,753 B1 * | 5/2003 | Ylitalo ................. | C09D 11/101 |
| | | | 427/466 |
| 8,608,305 B2 | 12/2013 | Hayata et al. | |
| 10,696,858 B2 | 6/2020 | Choi et al. | |
| 2002/0086914 A1 | 7/2002 | Lee et al. | |

(Continued)

FOREIGN PATENT DOCUMENTS

| | | |
|---|---|---|
| CN | 101165132 A | 4/2008 |
| EP | 2228416 A1 | 9/2010 |

(Continued)

OTHER PUBLICATIONS

International Search Report for PCT International Application No. PCT/IB2021/061857, mailed on Mar. 1, 2022, 4 pages.

*Primary Examiner* — Christopher M Polley

(57)            ABSTRACT

Provided is a laminate including a plasticizer-containing layer and an ink layer and having excellent adhesion between the plasticizer-containing layer and the ink layer and excellent low-temperature impact resistance, and a radiation curable ink.

6 Claims, 2 Drawing Sheets

(56)     References Cited

U.S. PATENT DOCUMENTS

| | | |
|---|---|---|
| 2010/0233448 A1 | 9/2010 | Kameyama |
| 2017/0260405 A1 | 9/2017 | Kumai et al. |
| 2022/0032660 A1 | 2/2022 | Yoda et al. |

FOREIGN PATENT DOCUMENTS

| | | |
|---|---|---|
| JP | H05202331 A | 8/1993 |
| JP | 05202331 B2 | 6/2009 |
| JP | 2011144250 A | 7/2011 |
| JP | 2012025912 A | 2/2012 |
| JP | 2015038202 A | 2/2015 |
| JP | 2015067656 A | 4/2015 |
| JP | 2017524751 A | 8/2017 |
| JP | 2017160403 A | 9/2017 |
| JP | 2019189856 A | 10/2019 |
| JP | 2022025899 A | 2/2022 |
| WO | 2008117092 A1 | 10/2008 |
| WO | 2015184166 A1 | 12/2015 |
| WO | 2016136098 A1 | 9/2016 |
| WO | 2017134962 A1 | 8/2017 |
| WO | 2020194136 A1 | 10/2020 |

* cited by examiner

INK OF THE PRESENT DISCLOSURE 130% ELONGATION     KNOWN INK 80% ELONGATION

LAMINATE COMPRISING PLASTICIZER-CONTAINING LAYER AND INK LAYER, AND RADIATION-CURABLE INK

CROSS REFERENCE TO RELATED APPLICATIONS

This application is a national stage filing under 35 U.S.C. 371 of PCT/IB2021/061857, filed Dec. 16, 2021, which claims the benefit of Japan Application No. 2020-210641, filed Dec. 18, 2020, the disclosure of which is incorporated by reference in its/their entirety herein.

TECHNICAL FIELD

The present disclosure relates to a laminate including a plasticizer-containing layer and an ink layer, and a radiation curable ink.

BACKGROUND ART

Radiation curable inks have recently been used in a wide variety of applications, for example decorative films used over the surface of a molded body.

Patent Document 1 (JP 2015-038202 A) discloses a radiation curable inkjet ink including at least two monofunctional (meth)acrylate monomers including a cyclic monofunctional (meth)acrylate monomer, and 2-(2-ethoxyethoxy)ethyl acrylate; a monofunctional monomer selected from the group consisting of N-vinylamide and N-acryloylamine or mixtures thereof; a polyfunctional (meth)acrylate monomer; a polymerizable (meth)acrylate oligomer; a radical photoinitiator; and a colorant, the radiation curable inkjet ink having a viscosity of 30 mPas or lower at 25° C.

Patent Document 2 (JP 2015-067656 A) discloses an ultraviolet ray curable inkjet ink usable for insert molding, the ultraviolet ray curable inkjet ink including a reactive monomer, a reactive oligomer, and a photopolymerization initiator, in which the reactive monomer is a cyclic structure-containing polymerizable monofunctional monomer that does not contain an aromatic ring and a lactam ring in a molecule, and the photopolymerization initiator is a hydroxyketone-based photopolymerization initiator.

SUMMARY

When a laminate prepared by applying a radiation curable ink to a film substrate is used, for example, in decorative applications, an operation of bonding the laminate to an adherend using a squeegee or the like may be performed outdoors. Typically, such a laminate requires good adhesion performance of the applied ink layer to the substrate, but even if such an operation is performed in a low-temperature environment such as cold regions, there is a risk that the ink layer applied to the substrate will be peeled off due to an impact such as the scrubbing of the squeegee.

Because of the excellent adhesion between the ink layer and the substrate, the ink layer does not necessarily have excellent impact resistance in low-temperature environments (sometimes referred to as "low-temperature impact resistance"). In addition, for example, for a substrate containing a plasticizer, the plasticizer bleeds over time on the surface thereof, and consequently, the adhesion between the ink layer and the substrate tends to decrease with increasing amount of bleeding of the plasticizer (FIG. 2), and the low-temperature impact resistance is also easily negatively affected.

The present disclosure provides a laminate including a plasticizer-containing layer and an ink layer and having excellent adhesion between the plasticizer-containing layer and the ink layer and excellent low-temperature impact resistance, and a radiation curable ink.

According to one embodiment of the present disclosure, there is provided a laminate including a plasticizer-containing layer; and an ink layer containing a cured product of a radiation curable ink, the radiation curable ink containing (A) a radiation curable polymerizable monomer having a nitrogen-containing heterocyclic structure; (B) at least one type selected from the group consisting of i) a radiation curable polymerizable polyfunctional (meth)acrylate oligomer and ii) a radiation curable polymerizable polyfunctional (meth)acrylate monomer; and (C) at least one type selected from the group consisting of i) a radiation curable polymerizable monofunctional (meth)acrylate monomer having a linear alkyl group and ii) a radiation curable polymerizable monofunctional vinyl monomer having a linear alkyl group, in which a content of the component (A) is greater than 10 parts by mass based on 100 parts by mass of the radiation curable resin component; and a content of the component (B) is greater than 15 parts by mass based on 100 parts by mass of the radiation curable resin component.

According to another embodiment of the present disclosure, there is provided a radiation curable ink containing (A) a radiation curable polymerizable monomer having a nitrogen-containing heterocyclic structure; (B) at least one type selected from the group consisting of i) a radiation curable polymerizable polyfunctional (meth)acrylate oligomer and ii) a radiation curable polymerizable polyfunctional (meth) acrylate monomer; and (C) at least one type selected from the group consisting of i) a radiation curable polymerizable monofunctional (meth)acrylate monomer having a linear alkyl group and ii) a radiation curable polymerizable monofunctional vinyl monomer having a linear alkyl group, in which a content of the component (A) is greater than 10 parts by mass based on 100 parts by mass of the radiation curable resin component; and a content of the component (B) is greater than 15 parts by mass based on 100 parts by mass of the radiation curable resin component.

According to the present disclosure, it is possible to provide a laminate including a plasticizer-containing layer and an ink layer and having excellent adhesion between the plasticizer-containing layer and the ink layer and excellent low-temperature impact resistance, and a radiation curable ink.

The above description should not be construed as disclosing all embodiments of the present invention and all advantages relating to the present invention.

DESCRIPTION OF EMBODIMENTS

Figure 1A:
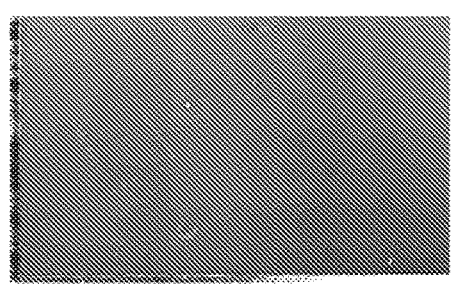
FIG. 1(a) is a photograph showing the state after adhesion testing of a laminate prepared by applying a radiation curable ink according to an embodiment of the present disclosure onto a vinyl chloride film where a plasticizer bleeds on its surface.
Figure 1B:
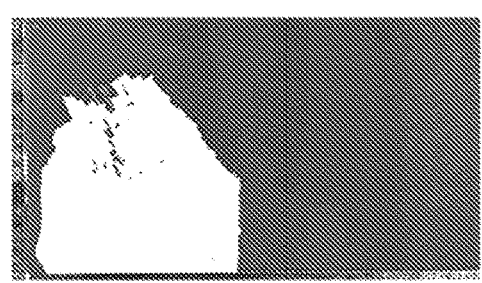
FIG. 1(b) is a photograph showing the state after adhesion testing of a laminate prepared by applying a known radiation curable ink onto a vinyl chloride film where a plasticizer bleeds on its surface.

Hereinafter, representative embodiments of the present invention will be described in more detail with reference to the drawing as required for the purpose of illustration, but the present invention is not limited to these embodiments.

In the present disclosure, a "plasticizer-containing layer" means a layer containing a plasticizer in a layer that constitutes a laminate, and includes, for example, a substrate containing a plasticizer (sometimes referred to as a "plasticizer-containing substrate"), a coating layer containing a plasticizer applied on a plasticizer-free substrate, and the like.

In the present disclosure, a "radiation curable" means the ability to cure by radiation such as ultraviolet rays, electron beams, X-rays, or the like. In the present disclosure, a "monofunctional" means a compound having only one reactive functional group.

In the present disclosure, a "polyfunctional" means a compound having two or more reactive functional groups.

In the present disclosure, an "oligomer" means a compound having a plurality of units derived from monomers. Typically, the weight average molecular weight of the oligomer may be greater than or equal to approximately 500, or greater than or equal to approximately 1,000. For example, a urethane (meth)acrylate oligomer is a compound including a plurality of units having a urethane bond, and having a (meth)acryloyl group.

In the present disclosure, a "radiation curable resin component" means a component (A), a component (B), and a component (C), as well as other radiation curable polymerizable monomers when present.

In the present disclosure, "(meth)acrylic" means acrylic or methacrylic, "(meth)acrylate" means acrylate or methacrylate, and "(meth)acryloyl" means acryloyl or methacryloyl.

In the present disclosure, the term "film" encompasses articles referred to as "sheets".

In the present disclosure, the term "on", for example used in "an ink layer is disposed on the substrate" means that the ink layer is disposed directly on the upper side of the substrate, or that the ink layer is indirectly disposed on the upper side of the substrate via other layers.

In the present disclosure, the term "under", for example used in "an adhesive layer is disposed under the substrate" means that the adhesive layer is disposed directly under the lower side of the substrate, or that the adhesive layer is indirectly disposed under the lower side of the substrate via other layers.

In the present disclosure, a "low-temperature environment" may be intended, for example, in a winter environment, a highly advanced environment in which an airplane moves, and the like. Specifically, for example, an environment at approximately 10° C. or lower, approximately 5° C. or lower, approximately 0° C. or lower, or approximately −5° C. or lower may be intended. The lower limit of the temperature in the low-temperature environment is not particularly limited and can be, for example, approximately −50° C. or higher, approximately −30° C. or higher, or approximately −10° C. or higher.

In the present disclosure, "substantially" means that a variation caused by a manufacturing error or the like is included, and is intended to allow a variation of approximately ±20%.

In the present disclosure, "transparent" refers to an average transmittance in the visible light region (wavelength of 400 nm to 700 nm) measured in accordance with JIS K 7375 of approximately 80% or greater, and the average transmittance may be desirably approximately 85% or greater or approximately 90% or greater. The upper limit of the average transmittance is not particularly limited, and can be, for example, less than approximately 100%, approximately 99% or less, or approximately 98% or less.

In the present disclosure, "translucent" refers to an average transmittance in the visible light region (wavelength of 400 nm to 700 nm) measured in accordance with JIS K 7375 of less than approximately 80%, and the average transmittance may be desirably approximately 75% or less, and is intended not to completely hide an underlying layer.

Hereinafter, the laminate including the plasticizer-containing layer and the ink layer, and the radiation curable ink, of the present disclosure will be described below with reference to the drawings as required.

The laminate of the present disclosure includes an ink layer containing a cured product of a radiation curable ink (sometimes referred to simply as "ink"). The ink layer may be a single layer, or may be a layered configuration of two or more layers. For example, a plasticizer bled from a plasticizer-containing substrate may further bleed to the ink layer surface beyond the ink layer applied to the substrate, but the ink of the present disclosure can improve the adhesion between the ink layers, and the like even when the ink layer is in a layered configuration.

The radiation curable ink contains at least one type selected from the group consisting of (A) a radiation curable polymerizable monomer having a nitrogen-containing heterocyclic structure, (B) i) a radiation curable polymerizable polyfunctional (meth)acrylate oligomer, and ii) a radiation curable polymerizable polyfunctional (meth)acrylate monomer; and at least one type selected from the group consisting of (C) i) a radiation curable polymerizable monofunctional (meth)acrylate monomer having a linear alkyl group and ii) a radiation curable polymerizable monofunctional vinyl monomer having a linear alkyl group.

The radiation curable polymerizable monomer having a nitrogen-containing heterocyclic structure of the component (A) can contribute to the improvement of adhesion between the layer of which a plasticizer is bleeding on a surface such as a plasticizer-containing substrate, and the ink layer (sometimes referred to simply as "adhesion").

The content of the component (A) in the radiation curable ink may be greater than approximately 10 parts by mass, greater than or equal to approximately 11 parts by mass, greater than or equal to approximately 13 parts by mass, or greater than or equal to approximately 15 parts by mass, based on 100 parts by mass of the radiation curable resin component, from the perspective of adhesion. The upper limit value of the content of the component (A) is not particularly limited, and can be less than or equal to approximately parts by mass, less than or equal to approximately 55 parts by mass, less than or equal to approximately 50 parts by mass, less than or equal to approximately 45 parts by mass, or less than or equal to approximately 40 parts by mass, from the perspective of obtaining a good balance of performance such as adhesion, low-temperature impact resistance, heat extensibility, and the like.

The radiation curable polymerizable monomer having a nitrogen-containing heterocyclic structure may be used alone, or in combination of two or more types. The monomer may be a monofunctional monomer or a polyfunctional monomer, but from the perspective of low-temperature impact resistance, heat extensibility, and the like, monofunctional monomers are preferable.

The radiation curable polymerizable monomer having a nitrogen-containing heterocyclic structure is not particularly limited, and, for example, a radiation curable polymerizable monomer having a (meth)acryloyl group and/or vinyl group and a nitrogen-containing heterocyclic structure can be used. Such monomers may include, for example, at least one type selected from the group consisting of (meth)acryloyl morpholine, N-vinyl-ε-caprolactam, 5-methyl-3-vinyl-1,3-oxazolidin-2-one, and 1-vinylimidazole. Among these, from the perspective of adhesion, low-temperature impact resistance, heat extensibility, and the like, (meth)acryloyl morpholine is preferable.

The i) radiation curable polymerizable polyfunctional (meth)acrylate oligomer and ii) radiation curable polymerizable polyfunctional (meth)acrylate monomer of the component (B) can contribute to improved adhesion and low-temperature impact resistance. The use of the radiation curable polymerizable polyfunctional (meth)acrylate oligomer can also contribute to improved elongation properties such as heat extensibility and scratch resistance. The oligomer and monomer may be each used alone, or in combination of two or more types.

The content of the component (B) in the radiation curable ink may be approximately greater than 15 parts by mass, approximately greater than or equal to 16 parts by mass, approximately greater than or equal to 18 parts by mass, or approximately greater than or equal to 20 parts by mass, based on 100 parts by mass of the radiation curable resin component, from the perspective of adhesion and low-temperature impact resistance. The upper limit value of the content of the component (B) is not particularly limited, and can be less than or equal to approximately 50 parts by mass, less than or equal to approximately 45 parts by mass, less than or equal to approximately 40 parts by mass, less than or equal to approximately 35 parts by mass, or less than or equal to approximately 30 parts by mass, from the perspective of obtaining a good balance of performance such as adhesion, low-temperature impact resistance, heat extensibility, scratch resistance, and the like.

The radiation curable polymerizable polyfunctional (meth)acrylate oligomer is not particularly limited and, for example, a (meth)acrylate oligomer having a functionality of from 2 to 6, preferably from 2 to 5, more preferably from 2 to 4, and even more preferably from 2 to 3 can be used. In addition to the ability to reduce adhesion failure associated with curing shrinkage, oligomers having a functionality of fewer than 6 can improve performance such as elongation properties and scratch resistance.

Examples of such (meth)acrylate oligomers may include urethane (meth)acrylate oligomers, polyester (meth)acrylate oligomers, and epoxy (meth)acrylate oligomers. Among these, from the perspective of adhesion, low-temperature impact resistance, heat extensibility, scratch resistance, and the like, a urethane (meth)acrylate oligomer is preferable, and a bifunctional urethane (meth)acrylate oligomer and/or a trifunctional urethane (meth)acrylate oligomer is/are more preferable.

In one embodiment, the radiation curable ink may be used as an ink, for example, in an ink-jet printing method. It is difficult to purge nitrogen in the inkjet printing method because of the configuration of the device, and generally the ink is radiation cured under an air atmosphere. Compared to trifunctional or higher polyfunctional monomers, bifunctional or monofunctional monomers or oligomers generally tend to be susceptible to oxygen inhibition and be difficult to cure in an air atmosphere. However, the ink containing the bifunctional urethane (meth)acrylate oligomer is easily cured even in an air atmosphere, and the cured resin component has excellent elongation properties and the like, and therefore is advantageous when the laminate is used as a decorative film, for example.

The bifunctional urethane (meth)acrylate oligomer and the trifunctional urethane (meth)acrylate oligomer are those in which 2 to 3 (meth)acryloyl groups are introduced in either the terminal or side chain of the urethane oligomer, which is the reaction product of a polyol such as a diol and a polyisocyanate such as a diisocyanate. A cured product is formed by reacting this (meth)acryloyl group with other bifunctional and/or trifunctional urethane (meth)acrylate oligomer, component (A), component (C), and the like. The bifunctional urethane (meth)acrylate oligomer and the trifunctional urethane (meth)acrylate oligomer may be one type or a combination of two or more types. All the polyol and the polyisocyanate constituting the oligomer can be one type or a combination of two or more types.

Examples of the polyol include polyester polyol, polyether polyol, polycarbonate polyol, and polycaprolactone polyol.

The polyol may include a low molecular weight diol. Examples of the low molecular weight diol include ethylene glycol, diethylene glycol, propylene glycol, dipropylene glycol, 1,3-butanediol, 1,4-butanediol, 2-methyl-1,3-propanediol, 1,5-pentanediol, 1,6-hexanediol, neopentyl glycol, 1,4-cyclohexanedimethanol, bisphenol A, bisphenol F, hydrogenated bisphenol A, hydrogenated bisphenol F, 1,2-cyclopentanediol, and tricyclo [5.2.1.0$^{2,6}$]decanedimethanol.

Examples of polyisocyanate include aliphatic isocyanate and aromatic isocyanate. Examples of the aliphatic isocyanate include tetramethylene diisocyanate, hexamethylene diisocyanate, 2,4,4-trimethylhexmethylene diisocyanate, 2,2,4-trimethylhexamethylene diisocyanate, decamethylene diisocyanate, 1,3-cyclohexane diisocyanate, 1,4-cyclohexane diisocyanate, isophorone diisocyanate, and 4,4'-methylene bis(cyclohexyl isocyanate). Examples of the aromatic isocyanate include 2,4,-toluene diisocyanate, 2,6-toluene diisocyanate, methylenediphenyl 4,4'-diisocyanate, 1,3-phenylene diisocyanate, 1,4-phenylene diisocyanate, 3,3'-dimethyldiphenylmethane-4,4'-diisocyanate, diphenylmethane-2,2'-diisocyanate, diphenylmethane-2,4'-diisocyanate, 4,4'-diisocyanato-3,3'-dimethylbiphenyl, 1,5-naphthalene diisocyanate, and 2-methyl-L5-naphthalene diisocyanate.

When both the polyol and the polyisocyanate are an aliphatic compound, the weather resistance of the ink layer containing the cured product of the radiation curable ink can be enhanced.

The (meth)acryloyl group can be introduced, for example, by a reaction of a hydroxyl group-containing (meth)acrylate with an isocyanato terminal of the urethane oligomer. Examples of the hydroxyl group-containing (meth)acrylate include 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, dipropylene glycol monoacrylate, and dipropylene glycol monomethacrylate. The hydroxyl group-containing (meth)acrylate may be used alone or two or more types thereof may be used in combination. In this embodiment, it is desirable that the polyisocyanate be used in an excess amount relative to the amount of the polyol, that is, the molar ratio of the NCO group to the OH group be greater than 1 during synthesis of the urethane oligomer.

The (meth)acryloyl group can be introduced by a reaction of an isocyanato group-containing (meth)acrylate with a hydroxyl group terminal of the urethane oligomer. Examples of the isocyanato group-containing (meth)acrylate include 2-isocyanatoethyl acrylate and 2-isocyanatoethyl methacrylate. In this embodiment, it is desirable that the polyol be used in an excess amount relative to the amount of the polyisocyanate, that is, the molar ratio of the NCO group to the OH group be less than 1 during synthesis of the urethane oligomer.

Examples of the bifunctional urethane (meth)acrylate oligomer include a polyester urethane di(meth)acrylate oligomer, a polycarbonate urethane di(meth)acrylate oligomer, and a polyether urethane di(meth)acrylate oligomer.

The bifunctional urethane (meth)acrylate oligomer is advantageously a bifunctional aliphatic urethane (meth)acrylate oligomer from the perspective of curability in an air atmosphere, elongation properties, and the like. The bifunctional aliphatic urethane (meth)acrylate oligomer can provide an ink layer containing a cured product having excellent weather resistance.

The number average molecular weight Mn of the bifunctional urethane (meth)acrylate oligomer can be greater than or equal to approximately 500, greater than or equal to approximately 1000, or greater than or equal to approximately 1200, and can be less than or equal to approximately 5000, less than or equal to approximately 4000, or less than or equal to approximately 3000. The weight average molecular weight Mw of the bifunctional urethane (meth)acrylate oligomer is generally greater than or equal to approximately 500, greater than or equal to approximately 1000, or greater than or equal to approximately 1200, and can be less than or equal to approximately 5000, less than or equal to approximately 4000, or less than or equal to approximately 3000. The number average molecular weight Mn and the weight average molecular weight Mw are values determined by gel permeation chromatography in terms of polystyrene.

The trifunctional urethane (meth)acrylate oligomer can improve the scratch resistance of the ink layer.

Examples of the trifunctional urethane (meth)acrylate oligomer include a polyester urethane tri(meth)acrylate oligomer, a polycarbonate urethane tri(meth)acrylate oligomer, and a polyether urethane tri(meth)acrylate oligomer.

From the perspective of scratch resistance and the like, it is advantageously a trifunctional aliphatic urethane (meth)acrylate oligomer.

The number average molecular weight Mn of the trifunctional urethane (meth)acrylate oligomer can be greater than or equal to approximately 500, greater than or equal to approximately 1000, or greater than or equal to approximately 1200, and can be less than or equal to approximately 5000, less than or equal to approximately 4000, or less than or equal to approximately 3000. The weight average molecular weight Mw of the trifunctional urethane (meth)acrylate oligomer can be greater than or equal to approximately 500, greater than or equal to approximately 1000, or greater than or equal to approximately 1200, and can be less than or equal to approximately 5000, less than or equal to approximately 4000, or less than or equal to approximately 3000.

It is preferable that the content of the trifunctional urethane (meth)acrylate oligomer in the radiation curable ink is greater than or equal to approximately 10 parts by mass, greater than or equal to approximately 20 parts by mass, greater than or equal to approximately 30 parts by mass, greater than or equal to approximately 40 parts by mass, or greater than or equal to approximately 50 parts by mass, based on 100 parts by mass of the total of the component (B), from the perspective of adhesion, low-temperature impact resistance, and scratch resistance. The upper limit value of the content of the trifunctional urethane (meth)acrylate oligomer is not particularly limited and can be, for example, less than or equal to approximately 100 parts by mass, less than approximately 100 parts by mass, less than or equal to approximately 95 parts by mass, or less than or equal to approximately 90 parts by mass.

The radiation curable polymerizable polyfunctional (meth)acrylate monomer is not particularly limited and, for example, a (meth)acrylate monomer having a functionality of from 2 to 6, preferably from 2 to 5, more preferably from 2 to 4, even more preferably from 2 to 3, and particularly preferably 2 can be used.

The polyfunctional (meth)acrylate monomer can function as a crosslinking agent, and enhance the strength and durability of the cured product. When crosslinking is performed using the monomer, adhesive properties between the ink layer containing the cured product and the substrate or the other layer on the ink layer may be enhanced. When the elongation properties are required, it is preferable that the monomer is not used or used in combination with the oligomer described above. When used in combination, the content of the polyfunctional (meth)acrylate monomer is preferably greater than or equal to approximately 0.5 parts by mass, or greater than or equal to approximately 1 part by mass, and less than or equal to approximately 15 parts by mass, less than or equal to approximately 10 parts by mass, less than or equal to approximately 5 parts by mass, or less than or equal to approximately 3 parts by mass, based on 100 parts by mass of the radiation curable resin component.

Examples of such a polyfunctional (meth)acrylate monomer may include a bifunctional (meth)acrylate such as 1,4-butanediol di(meth)acrylate, 1,6-hexanediol di(meth)acrylate, ethyleneglycol di(meth)acrylate, cyclohexanedimethanol di(meth)acrylate, diethyleneglycol di(meth)acrylate, dipropyleneglycol di(meth)acrylate, and polyethyleneglycol di(meth)acrylate; a trifunctional (meth)acrylate such as glycerol tri(meth)acrylate, trimethylolpropane tri(meth)acrylate, and pentaerythritol tri(meth)acrylate; and a (meth)acrylate having four or more functional groups such as ditrimethylolpropane tetra(meth)acrylate, dipentaerythritol penta(meth)acrylate, and pentaerythritol tetra(meth)acrylate. Among these, from the perspective of adhesion and low-temperature impact resistance, 1,6-hexanediol di(meth)acrylate is preferable.

The i) radiation curable polymerizable monofunctional (meth)acrylate monomer having a linear alkyl group and ii) radiation curable polymerizable monofunctional vinyl monomer having a linear alkyl group of the component (C) can contribute to improved low-temperature impact resistance. These monomers may be each used alone, or in combination of two or more.

From the perspective of low-temperature impact resistance, the content of the component (C) in the radiation curable ink may be greater than or equal to approximately 1 part by mass, greater than or equal to approximately 3 parts by mass, greater than or equal to approximately 5 parts by mass, greater than or equal to approximately 7 parts by mass, greater than or equal to approximately 10 parts by mass, greater than approximately 10 parts by mass, greater than or equal to approximately 11 parts by mass, greater than or equal to approximately 12 parts by mass, greater than or equal to approximately 13 parts by mass, greater than or equal to approximately 14 parts by mass, or greater than or equal to approximately 15 parts by mass, based on 100 parts by mass of the radiation curable resin component. The upper limit value of the content of the component (C) is not particularly limited, and can be less than or equal to approximately 60 parts by mass, less than or equal to approximately 55 parts by mass, less than or equal to approximately 50 parts by mass, less than or equal to approximately 45 parts by mass, less than or equal to approximately 40 parts by mass, less than or equal to approximately 35 parts by mass, less than or equal to approximately 30 parts by mass, less than or equal to approximately 25 parts by mass, or less than or equal to approximately 20 parts by mass, from the perspective of obtaining a good balance of performance such as adhesion, low-temperature impact resistance, heat extensibility, and the like.

The radiation curable polymerizable monofunctional (meth)acrylate monomer and vinyl monomer having a linear alkyl group used as the component (C) are not particularly limited and, for example, a monomer having a linear alkyl group having greater than or equal to 6, greater than or equal to 7, or greater than or equal to 8 carbon atoms can be used. The upper limit value of the carbon atoms in the linear alkyl group is not particularly limited and can be, for example, less than or equal to 20, less than or equal to 18, less than or equal to 16, less than or equal to 15, less than or equal to 14, less than or equal to 13, or less than or equal to 12. In addition to the ability to improve low-temperature impact resistance, such monomers can also exhibit good discharge performance when an ink containing such monomers is used as an inkjet ink, for example.

Examples of the monofunctional (meth)acrylate monomer may include n-hexyl (meth)acrylate, n-heptyl (meth)acrylate, n-octyl (meth)acrylate, n-nonyl (meth)acrylate, n-decyl (meth)acrylate, n-undecyl (meth)acrylate, n-dodecyl (meth) acrylate, n-tridecyl (meth)acrylate, n-tetradecyl (meth)acrylate, n-pentadecyl (meth)acrylate, and n-octadecyl (meth) acrylate. Among these, n-octyl (meth)acrylate, n-nonyl (meth)acrylate, n-decyl (meth)acrylate, n-undecyl (meth) acrylate, and n-dodecyl (meth)acrylate are preferable from the perspective of adhesion, low-temperature impact resistance, heat extensibility, ink discharge properties, and the like.

Examples of the monofunctional vinyl monomer may include n-hexyl vinyl ether, n-heptyl vinyl ether, n-octyl vinyl ether, n-nonyl vinyl ether, n-decyl vinyl ether, n-undecyl vinyl ether, n-dodecyl vinyl ether, n-tridecyl vinyl ether, n-tetradecyl vinyl ether, n-pentadecyl vinyl ether, and n-octadecyl vinyl ether. Among these, n-octyl vinyl ether, n-nonyl vinyl ether, n-decyl vinyl ether, n-undecyl vinyl ether, and n-dodecyl vinyl ether are preferable from the perspective of adhesion, low-temperature impact resistance, heat extensibility, ink discharge properties, and the like.

In some embodiments, the radiation curable ink may contain other radiation curable polymerizable monomers (sometimes referred to as "component (D)"), in addition to the aforementioned components (A) to (C). Examples of the other radiation curable polymerizable monomer include monofunctional monomers including alicyclic (meth)acrylates such as cyclohexyl (meth)acrylate, trimethylcyclohexyl (meth)acrylate, and isobornyl (meth)acrylate; phenoxyalkyl (meth)acrylates such as phenoxyethyl (meth) acrylate; alkoxyalkyl (meth)acrylates such as methoxypropyl (meth)acrylate, 2-methoxybutyl (meth)acrylate, and 2-(2-ethoxyethoxy)ethyl (meth)acrylate; cyclic ether-containing (meth)acrylates such as glycidyl (meth) acrylate and tetrahydrofurfuryl (meth)acrylate; hydroxy group-containing (meth)acrylates such as 2-hydroxyethyl (meth)acrylate, 2-hydroxypropyl (meth)acrylate, and 4-hydroxybutyl (meth)acrylate; nitrogen-containing (meth)acryloyl compounds such as (meth)acrylamide and N,N-diethyl (meth)acrylamide; and (meth)acrylic acid. In addition, examples thereof include monofunctional monomers including vinyl compounds such as vinyl acetate, vinyl propionate, styrene, and vinyltoluene; unsaturated nitriles such as acrylonitrile and methacrylonitrile; and unsaturated carboxylic acids such as crotonic acid, itaconic acid, fumaric acid, citraconic acid, and maleic acid. Among these, from the perspective of ink viscosity reduction, storage stability, and the like, alicyclic (meth)acrylate and cyclic ether-containing (meth)acrylate are preferable, trimethylcyclohexyl (meth) acrylate and tetrahydrofurfuryl (meth)acrylate are more preferable, and further, from the perspective of low-temperature impact resistance, cyclic ether-containing (meth) acrylate is preferable, and tetrahydrofurfuryl (meth)acrylate is more preferable. The other radiation curable polymerizable monomers may be used alone, or in combination of two or more.

From the perspective of ink viscosity reduction, storage stability, and the like, the content of the component (D) in the radiation curable ink can be greater than or equal to approximately 5 part by mass, greater than or equal to approximately 7 parts by mass, greater than or equal to approximately 10 parts by mass, greater than or equal to approximately 13 parts by mass, greater than or equal to approximately 15 parts by mass, or greater than approximately 20 parts by mass, and less than or equal to approximately 50 parts by mass, less than or equal to approximately 45 parts by mass, less than or equal to approximately 40 parts by mass, less than or equal to approximately 35 parts by mass, or less than or equal to approximately 30 parts by mass, based on 100 parts by mass of the radiation curable resin component.

As the other radiation curable polymerizable monomer, a radiation curable polymerizable monofunctional (meth) acrylate monomer having a branched alkyl group (e.g., isodecyl (meth)acrylate monomer, 2-ethylhexyl (meth)acrylate, isooctyl (meth)acrylate) may be blended into the radiation curable ink. When such a monomer is blended in the ink instead of the component (C), the low-temperature impact resistance is negatively affected. However, when the monomer is used in combination with the component (C), the low-temperature impact resistance can be improved even when the component (C) is blended in a small amount (e.g., greater than or equal to approximately 1 part by mass or greater than or equal to approximately 3 parts by mass in the blended amount of the component (C) described above). From the perspective of low-temperature impact resistance, the amount of the monomer blended is preferably less than or equal to approximately 30 parts by mass, less than or equal to approximately 25 parts by mass, less than or equal to approximately 20 parts by mass, less than or equal to approximately 15 parts by mass, less than or equal to approximately 10 parts by mass, less than or equal to approximately 5 parts by mass, or less than or equal to approximately 1 part by mass, based on 100 parts by mass of the radiation curable resin component. The lower limit of the amount of the monomer blended is not particularly limited and can be, for example, greater than or equal to approximately 0.5 parts by mass, greater than or equal to approximately 1 part by mass, greater than or equal to approximately 3 parts by mass, or greater than or equal to approximately 5 parts by mass.

In some embodiments, the radiation curable ink of the present disclosure may contain a photopolymerization initiator. As a photopolymerization initiator, for example, a publicly known compound which induces a radical polymerization reaction can be used. As the photopolymerization initiator, any of an intramolecular cleavage type photopolymerization initiator and a hydrogen-abstracting type photopolymerization initiator can be used. Examples thereof include 1-hydroxycyclohexyl phenyl ketone, an oligomer of 2-hydroxy-1-(4-isopropenylphenyl)-2-methylpropan-1-one, 2,2-dimethoxy-2-phenylacetophenone, 2-methyl-1[4-(methylthio)phenyl]-2-morpholinopropan-1-one, 2-hydroxy-2-methyl-1-phenylpropan-1-one, 2-benzyl-2-dimethylamino-1-(4-morpholinophenyl)-butan-1-one, 1-[4-(2-hydroxyethoxy)-phenyl]-2-hydroxy-2-methyl-1-propan-1-one, benzophenone, 2,4,6-trimethylbenzoyldiphenylphosphine oxide, 2,6-dimethylbenzoyldiphenylphosphine oxide, benzoyldiethoxyphosphine oxide, bis(2,6-dimethoxybenzoyl)-2,4,4-trimethylpentylphosphine oxide, benzoin alkyl ether (e.g., benzoin methyl ether, benzoin ethyl ether, benzoin isopropyl ether, benzoin isobutyl ether, and n-butyl benzoin ether), methylbenzoyl formate, methyl-o-benzoylbenzoate, 1-(4-isopropylphenyl)-2-hydroxy-2-methylpropan-1-one, 2-hydroxy-2-methyl-1-phenylpropan-1-one, p-tert-butyltrichloroacetophenone, p-tert-butyldichloroacetophenone, benzyl, acetophenone, a thioxanthone compound (2-chlorothioxanthone, 2-methylthioxanthone, 2,4-diethylthioxanthone, and 2,4-diisopropylthioxanthone), camphorquinone, 3-ketocoumarin, an anthraquinone compound (e.g., anthraquinone, 2-ethylanthraquinone, α-chloroanthoraquinone, and 2-tert-butylanthoraquinone), acenaphthene, 4,4'-dimethoxybenzyl, and 4,4'-dichlorobenzyl. The photopolymerization initiator may be used alone or two or more types thereof may be used in combination.

The content of the photopolymerization initiator in the radiation curable ink is not particularly limited, and can be, for example, greater than or equal to approximately 1 part by mass, or greater than or equal to approximately 2 parts by mass, and less than or equal to approximately 20 parts by mass, or less than or equal to approximately 15 parts by mass, based on 100 parts by mass of the radiation curable resin component.

The radiation curable ink may contain, as any component, an additive such as a light stabilizer, a polymerization inhibitor, an UV absorbent, a defoamer, an anti-smudge agent, a surface conditioner, a filler, a dispersant, a pigment, and a dye, or an organic or water-based solvent.

When reducing the viscosity of the ink, generally, an organic solvent or a water-based solvent is often blended and diluted. However, for example, the use of an organic solvent deteriorates the working environment, and both the solvents requires a drying step after printing, and therefore, productivity and the like tend to become poor. When ink containing a large amount of solvent is printed on a substrate by, for example, an inkjet printing method, the landing ink is prone to wetting and spreading on the surface of the substrate, and therefore, it may not be possible to sufficiently exhibit the intended printing performance. On the other hand, when the ink contains a small amount of solvent or is solvent-free, the landing ink is difficult to wet and spread on the surface of the substrate, and therefore, it is possible to exhibit good printing performance, and for example, it is possible to impart three-dimensional convexities and concavities to the surface of the substrate in correspondence with a design such as a texture or decorative film with the authentic texture. In some embodiments, the radiation curable ink of the present disclosure may achieve low viscosity of the ink using the aforementioned components (A) to (C), and optionally the component (D) described above. Therefore, the content of the solvent can be set to less than or equal to approximately 5 mass %, less than or equal to approximately 3 mass %, or less than or equal to approximately 1 mass % with respect to the total amount of the ink, or a solvent may not be contained.

The viscosity of the radiation curable ink of the present disclosure is not particularly limited, and can be approximately less than or equal to 14 mPa·s, less than or equal to approximately 13 mPa·s, or less than or equal to approximately 12 mPa·s at 60° C., from the perspective of coating properties, discharge properties from inkjet nozzles, and the like. The lower limit of the viscosity is not particularly limited and can be, for example, greater than or equal to approximately 1 mPa·s, greater than or equal to approximately 3 mPa·s, or greater than or equal to approximately 5 mPa·s, from the perspective of printing suitability. Here, the viscosity of the ink is a value measured by a Discovery HR-2 (DHR-2) rheometer (available from TA Instruments) under conditions of a shear rate of 5,000 sec⁻1 using a 60 mm cone plate (available from TA Instruments).

The ink layer of the present disclosure can be formed, for example, by applying the radiation curable ink onto the substrate directly or via other layers by a well-known printing method or coating method, and curing by irradiating with radiation such as ultraviolet rays, electron beams, or the like. Since the ink layer prepared using the radiation curable ink of the present disclosure has excellent adhesion to a layer containing a plasticizer, it is advantageous to apply the ink layer directly to a plasticizer-containing layer such as a plasticizer-containing substrate.

Examples of the method of printing or coating the radiation curable ink may include an inkjet printing method, a gravure coating method, a bar coating method, a knife coating method, a capillary coating method, a spray coating method, and a stereoscopic printing method using stereolithography (sometimes referred to as "laminate shaping method"). Among these, the radiation curable ink of the present disclosure can be suitably used for inkjet printing method. The ink layers prepared by these methods can be distinguished from each other, for example, by representing as an inkjet printing ink layer, a gravure coating ink layer, and the like.

The radiation curable ink may be applied, for example, on a substrate, partially or entirely. The ink layer may have a substantially smooth surface, or may have a concavo-convex shape such as an embossing pattern on the surface.

In order to provide an intended appearance, the ink layer may be transparent, semitransparent, or opaque entirely or partially in a visible area. The ink layer may be colorless or may be colored entirely or partially.

The thickness of the ink layer is not particularly limited, and can be appropriately adjusted in accordance with the required performance (e.g., designability, and surface protection performance). For example, the thickness of the ink layer can be at least partially approximately 1 micrometer or greater, approximately 3 micrometers or greater, approximately 5 micrometers or greater, approximately 7 micrometers or greater, approximately 15 micrometers or greater, approximately 20 micrometers or greater, or approximately 30 micrometers or greater. For example, when the ink layer has a portion having a thickness of approximately 7 micrometers or greater, in the case of using a laminate provided with the ink layer having convexities and concavities as a decorative film, it is possible to impart three-dimensional convexities and concavities to the surface of the decorative film in correspondence with a design such as a texture or decorative film with the authentic texture.

In some embodiments, the maximum thickness of the ink layer can be, for example, approximately 500 micrometers or less, approximately 300 micrometers or less, approximately 100 micrometers or less, approximately 50 micrometers or less, approximately 40 micrometers or less, approximately 30 micrometers or less, approximately 20 micrometers or less, or approximately micrometers or less. When the maximum thickness of the ink layer is approximately 500 micrometers or less, the flexible properties, for example, elongation properties and bending properties of the ink layer can be made suitable.

The thickness of the ink layer can be appropriately adjusted by, for example, repeatedly printing or coating with the radiation curable ink locally or entirely a plurality of times. Here, the cross section in the thickness direction of the laminated structure is measured using a scanning electron microscope (SEM), and the thickness of each layer in the laminate of the present disclosure can be an average value of the thicknesses at at least any five points of a target layer in the laminated structure, for example, the ink layer.

In some embodiments, the maximum height of roughness Rz of the ink layer can be approximately 0.5 micrometers or greater, approximately 1 micrometer or greater, or approximately 1.5 micrometers or greater, and can be approximately 20 micrometers or less, approximately 15 micrometers or less, or approximately 10 micrometers or less. When the maximum height of roughness Rz of the ink layer is in the above range, in the case of using a laminate provided with the ink layer having convexities and concavities as a decorative film, it is possible to impart three-dimensional convexities and concavities to the surface of the decorative film in correspondence with a design such as a texture or decorative film with the authentic texture. Here, the maximum height of roughness Rz of the ink layer is determined in accordance with JIS B 0601: 2013 (corresponding to ISO 4287: 1997).

The substrate that may be employed in the laminate of the present disclosure can be used, for example, as a support for the ink layer. The surface of the substrate may be subjected to surface treatment such as corona treatment, or plasma treatment.

The material for the substrate is not particularly limited, and examples thereof may include a variety of resin materials including a polyvinyl chloride resin, a polyurethane resin, a polyolefin resin such as polyethylene (PE) and polypropylene (PP), a polyester resin such as polyethylene terephthalate (PET) and polyethylene naphthalate (PEN), a (meth)acrylic resin such as a polycarbonate resin, a polyimide resin, a polyamide resin, and polymethylmethacrylate (PMMA), a fluororesin, and a copolymer such as an ethylene-vinyl acetate copolymer (EVA), an ethylene-acrylic acid copolymer, an ethylene-ethyl acrylate copolymer, an ethylene-vinyl acetate copolymer, an acrylonitrile-butadiene rubber (NBR), and an acrylonitrile-butadiene-styrene copolymer (ABS). Among such resin materials, a polyvinyl chloride resin is preferable from the perspective of reducing or preventing the tear of the laminate due to impact such as a squeegee in low-temperature environments. These components can be used alone, or in combination of two or more. Examples of the substrate that can also be used include inorganic substrates such as glass, and metal-based substrates such as aluminum and steel.

The ink layer prepared using the radiation curable ink of the present disclosure provides good adhesion and low-temperature impact resistance to the plasticizer-containing layer, and thus a plasticizer-containing substrate can be suitably used as the substrate. The plasticizer-containing substrate can be prepared, for example, using a mixed material containing the resin material and the plasticizer described above, and a polyvinyl chloride resin can be suitably used as the resin material. As the plasticizer-containing substrate, a substrate prepared from such a mixed material alone may be used, or a substrate prepared by coating the inorganic substrate or the metal-based substrate with the mixed material described above may be employed.

The plasticizer is not particularly limited, and examples thereof include phthalic acid-based plasticizers such as phthalates (e.g., dibutyl phthalate (DBP), dioctyl phthalate (DOP), diisononyl phthalate (DINP), diisodecyl phthalate (DIDP), and diundecyl phthalate (DUP)); adipic acid-based plasticizers such as adipates (e.g., dibutyl adipate, dihexyl adipate, dioctyl adipate, and di-2-ethylhexyl adipate); phosphoric acid-based plasticizers such as tributyl phosphate, tricresyl phosphate, and triphenyl phosphate; trimellitic acid-based plasticizers such as tributyl trimellitate and trioctyl trimellitate; various known polyester-based plasticizers such as adipic acid-based polyester; citrates such as acetyl tributyl citrate and acetyl trioctyl citrate; and the like. These plasticizers may be used alone, or in combination of two or more types. Among these, at least one type selected from the group consisting of adipic acid-based plasticizer and phthalic acid-based plasticizer can be suitably used.

The content of the plasticizer in the plasticizer-containing layer is not particularly limited, and can be, for example, greater than or equal to approximately 10 parts by mass, greater than or equal to approximately 20 parts by mass, or greater than or equal to approximately 30 parts by mass, and less than or equal to approximately 100 parts by mass, less than or equal to approximately 70 parts by mass, or less than or equal to approximately 50 parts by mass, based on 100 parts by mass of the resin material constituting the plasticizer-containing layer, from the perspective of flexibility and the like. The ink layer prepared with the radiation curable ink of the present disclosure can be suitably used as an ink for a plasticizer-containing layer that can be applied directly to the plasticizer-containing layer because good adhesion and low-temperature impact resistance can be obtained for the plasticizer-containing layer in which the plasticizer may bleed to the surface (FIG. 1(a)). Here, the presence or absence of the plasticizer on the plasticizer-containing layer surface can be confirmed using, for example, secondary ion mass spectrometry.

The shape or configuration of the substrate is not particularly limited: it can be, for example, film shape, plate shape, curved surface shape, deformed shape, or three-dimensional shape, and it can also be single-layer configuration, laminated configuration, or composite configuration such as in which plural substrates in different shapes are combined.

The substrate may be colored or colorless. The substrate may be opaque, translucent or transparent. The substrate may include a substantially smooth surface and may include a structured surface that can be formed by surface processing such as embossing.

The thickness of the substrate is not particularly limited and can be, for example, at least partially approximately 50 micrometers or greater, approximately 80 micrometers or greater, or approximately 100 micrometers or greater. Such a thickness can further reduce or prevent tear of the laminate due to impact of a squeegee or the like in low-temperature environments, for example. The upper limit of the thickness is not particularly limited and can be, for example, approximately 500 micrometers or less, approximately 300 micrometers or less, or approximately 200 micrometers or less, from the perspective of conformability, production costs, and the like.

In some embodiments, the laminate of the present disclosure may further include, as optional constituents, additional layers such as a protective layer, a decorative layer, a brightening layer, a bonding layer, an adhesive layer, a release liner, and the like. These additional layers can be employed alone or in combination of two or more. In the present disclosure, a decorative laminate, for example, a laminate provided with a colored substrate and/or a colored ink layer, or a laminate provided with a decorative layer and/or a brightening layer may be referred to as a decorative film.

Additional layers, for example, a protective layer and a decorative layer, may be prepared using the radiation curable ink described above, but may be prepared using common materials as shown below.

In some embodiments, a protective layer can be disposed on the surface of the laminate. The protective layer may have a function to protect other layers constituting the laminate, such as the ink layer, the decorative layer, and the like described above, from punctures, impacts, or the like from the outside.

The protective layer may be a multi-layer laminate, for example, a multi-layer extrusion laminate. The protective layer may further have a receptor layer on its surface, and the protective layer itself may have receptor performance. By using a protective layer having a receptor layer or receptor performance, a decorative layer such as a graphic image can be directly formed on the protective layer by inkjet printing or the like. The protective layer may have a substantially smooth surface, or may have an uneven shape such as a matte pattern or an emboss pattern on the surface. The surface of the protective layer may be subjected to surface treatment such as corona treatment or plasma treatment.

As materials of the protective layer, a variety of resins, for example, (meth)acrylic resins including polymethyl methacrylate (PMMA), polyurethane, fluorine resins such as ethylene-tetrafluoroethylene copolymer (ETFE), polyvinylidene fluoride (PVDF), and methyl methacrylate-vinylidene fluoride copolymer, silicone-based copolymer, polyvinyl chloride, polycarbonate, acrylonitrile-butadiene-styrene copolymer (ABS), polyolefins such as polyethylene and polypropylene, polyesters such as polyethylene terephthalate (PET) and polyethylene naphthalate (PEN), and copolymers such as ethylene-acrylic acid copolymer, ethylene-ethyl acrylate copolymer, and ethylene-vinyl acetate copolymer, or mixtures thereof can be used. From the viewpoints of transparency, strength, impact resistance, and the like, a (meth)acrylic resin, polyurethane, a fluorine resin, polyvinyl chloride, polyethylene terephthalate, an acrylonitrile-butadiene-styrene copolymer, and polycarbonate can be advantageously used as materials for the protective layer. Furthermore, from the viewpoint of weather resistance, a (meth)acrylic resin is advantageous.

The protective layer may contain, as necessary, UV absorbents such as benzotriazole, Tinuvin (trade name) 400 (manufactured by BASF), and hindered amine light stabilizers (HALS) such as Tinuvin (trade name) 292 (manufactured by BASF). By using UV absorbents, hindered amine light stabilizers, and the like, deterioration of layers located under the protective layer, for example, discoloration, fading, and deterioration of the decorative layer can be effectively prevented. The protective layer may include a hard coating material, a luster-imparting agent, and the like, and may also have an additional hard coating layer.

In order to provide an intended appearance (e.g., matte appearance), the protective layer may be transparent, semi-transparent, or opaque entirely or partially in a visible area. The protective layer may be colorless or may be colored entirely or partially.

The thickness of the protective layer can be at least partially approximately 1 micrometer or greater, approximately 5 micrometers or greater, approximately 10 micrometers or greater, approximately 25 micrometers or greater, or approximately 40 micrometers or greater, and can be approximately 500 micrometers or less, approximately 300 micrometers or less, approximately 100 micrometers or less, approximately 50 micrometers or less, approximately 40 micrometers or less, or approximately 30 micrometers or less.

In the laminate of the present disclosure, the decorative layer can be disposed on or under the substrate, for example. The decorative layer can be applied to the entire surface or a portion of the substrate, for example.

Examples of the decorative layer include, but are not limited to, a color layer that exhibits a paint color, for example, a light color, such as white and yellow, and a strong color, such as red, brown, green, blue, gray, and black; a pattern layer that imparts a design pattern (such as a wood grain, a stone grain, a geometric pattern, or a leather pattern), a logo, a picture pattern, or the like to an article; a relief (embossed pattern) layer in which an uneven shape is provided on the surface; and combinations of these layers.

The raw material for the color layer is not limited to the following, but for example, a raw material obtained by dispersing a pigment in a binder resin, such as a (meth)acrylic resin or a polyurethane resin, can be used, the pigment being, such as an inorganic pigment (such as carbon black, chrome yellow, yellow iron oxide, colcothar, or red iron oxide); or an organic pigment, such as a phthalocyanine pigment (such as phthalocyanine blue or phthalocyanine green), an azo lake pigment, an indigo pigment, a perinone pigment, a perylene pigment, a quinophthalone pigment, a dioxazine pigment, or a quinacridone pigment (such as quinacridone red).

The color layer can be formed using such a raw material, for example, by a coating method, such as gravure coating, roll coating, die coating, bar coating, or knife coating or can be also formed by a printing method, such as inkjet printing.

As a pattern layer, although not limited to the following, pattern layers obtained by printing a pattern such as a pattern, logo, or design directly on the substrate or the like using a printing method such as gravure direct printing, gravure offset printing, inkjet printing, laser printing, or screen printing may be employed, or a film, sheet, or the like having a pattern, logo, design, or the like formed by coating such as gravure coating, roll coating, die coating, bar coating, or knife coating, punching, etching, or the like also can be used. For example, a raw material similar to those used in the color layer can be used for the pattern layer.

For the relief layer, a thermoplastic resin film having an uneven shape on the surface may be used, the uneven shape being obtained by a well-known method in the art, such as, for example, emboss finishing, scratch processing, laser processing, dry etching processing, or hot press processing. The relief layer can be also formed by applying a thermosetting or radiation curable resin, such as a curable (meth) acrylic resin, on a release liner having a concavo-convex shape, curing the resin by heat or radiation, and removing the release liner.

The thermoplastic resin, thermosetting resin, and radiation curable resin used in the relief layer are not particularly limited, but for example, a fluororesin; a polyester resin, such as PET or PEN; a (meth)acrylic resin; a polyolefin resin, such as polyethylene or polypropylene; a thermoplastic elastomer; a polycarbonate resin; a polyamide resin; an ABS resin; an acrylonitrile-styrene resin; a polystyrene resin, a polyvinyl chloride resin, or a polyurethane resin may be used. The relief layer may contain at least one of the pigments used in the color layer.

The thickness of the decorative layer may be appropriately adjusted in accordance with the required decorativeness, concealability, and the like and is not particularly limited. For example, the thickness can be at least partially approximately 1 micrometer or greater, approximately 3 micrometers or greater, or approximately 5 micrometers or greater, and can be approximately micrometers or less, approximately 40 micrometers or less, approximately 30 micrometers or less, approximately 20 micrometers or less, or approximately 15 micrometers or less.

Examples of the brightening layer may include, but are not limited to, layers containing a metal selected from aluminum, nickel, gold, silver, copper, platinum, chromium, iron, tin, indium, titanium, lead, zinc, or germanium, or an alloy or compound thereof, formed by vacuum deposition, sputtering, ion plating, plating, or the like on the entire surface or a portion of the substrate or the decorative layer. The brightening layer may be applied in the form of a foil or sheet.

The thickness of the brightening layer is not particularly limited, and can be appropriately selected in accordance with the required performance (for example, decorativeness, brightness and incombustibility) and costs. For example, in the case where incombustibility is required in addition to decorativeness, the thickness of the brightening layer can be approximately 8 micrometers or greater, approximately 10 micrometers or greater, or approximately 15 micrometers or greater, and can be approximately 200 micrometers or less, approximately 150 micrometers or less, or approximately 100 micrometers or less. For example, in the case where the brightening layer contains aluminum, the thickness of the brightening layer can be approximately 12 micrometer or greater, approximately 15 micrometers or greater, or approximately 25 micrometers or greater, and can be approximately 30 micrometer or greater, approximately 40 micrometers or greater, or approximately 50 micrometers or greater, and thus more excellent incombustibility can be obtained. In the case where incombustibility is not required, the thickness of the brightening layer can be approximately less than 8 micrometers or approximately 5 micrometers or less, and can be approximately 0.1 micrometers or greater, 0.5 micrometers or greater, or 1 micrometer or greater.

A bonding layer (sometimes referred to as a "primer layer" or the like) may be used to bond the layers constituting the laminate. For the bonding layer, for example, a typically used adhesive can be used, such as a solvent, emulsion, pressure-sensitive, heat-sensitive, thermosetting, or radiation curable adhesive of (meth)acrylic, polyolefin, polyurethane, polyester, or rubber. The bonding layer can be applied by a well-known coating method or the like.

The thickness of the bonding layer can be, for example, approximately micrometers or greater, approximately 0.5 micrometers or greater, or approximately 5 micrometers or greater, and can be approximately 100 micrometers or less, approximately 50 micrometers or less, approximately 20 micrometers or less, or approximately 10 micrometers or less.

The laminate may further include an adhesive layer for affixing the laminate to an adherend. A material similar to those used in the bonding layer can be used for the adhesive layer. The adhesive layer may be applied to the adherend rather than the laminate.

The thickness of the adhesive layer is not limited to the following but, for example, can be approximately 5 micrometers or greater, approximately 10 micrometers or greater, or approximately 20 micrometers or greater, and can be approximately 200 micrometers or less, approximately 100 micrometers or less, or approximately 80 micrometers or less.

The substrate of the present disclosure and the additional layers such as the protective layer, the decorative layer, the bonding layer, and the adhesive layer can contain, in accordance with the use application and the like, as optional components, fillers, reinforcing materials, antioxidants, frame retardants, antibacterial agents, deodorants, UV absorbents, photostabilizers, thermal stabilizers, dispersants, plasticizers, flow enhancing agents, tackifiers, leveling agents, silane coupling agents, catalysts, pigments, dyes, thickeners, and the like. These optional components can be used alone, or in combination of two or more types.

When an additional layer, for example, a protective layer or a decorative layer, contains a plasticizer and constitutes a plasticizer-containing layer, it is preferred that such a plasticizer-containing layer is applied to the other layers via the ink layer with the radiation curable ink described above. When the bonding layer and/or the adhesive layer is applied to the plasticizer-containing layer, the bonding layer and the adhesive layer preferably contain no plasticizer or a plasticizer in a range of less than or equal to approximately 20 parts by mass, less than or equal to approximately 10 parts by mass, less than or equal to approximately 5 parts by mass, or less than or equal to approximately 1 part by mass per 100 parts by mass of the resin material constituting the bonding layer or the adhesive layer.

To protect the adhesive layer, an optional preferred release liner can be used. Representative examples of the release liner include those prepared from paper (e.g., kraft paper) or a polymer raw material (e.g., polyolefin, such as polyethylene or polypropylene; ethylene vinyl acetate; polyurethane; or polyester, such as polyethylene terephthalate). The release liner may be applied as necessary with a layer of a release agent, such as a silicone-containing raw material or a fluorocarbon-containing raw material.

The thickness of the release liner, for example, can be approximately 5 micrometers or greater, approximately 15 micrometers or greater, or approximately 25 micrometers or greater, and can be approximately 300 micrometers or less, approximately 200 micrometers or less, or approximately 150 micrometers or less. The thickness of the release liner is an average value calculated from at least five measurements of thickness at any portion of the release liner after removing the release liner from the adhesive layer, the measurements being made using High-Accuracy Digimatic Micrometer (MDH-available from Mitutoyo Corporation).

When the laminate of the present disclosure is constituted with, for example, the substrate and the ink layer, the ink layer can be prepared using a well-known printing method such as an inkjet printing method, or a coating method as described above. However, when the laminate optionally contains the other additional layer, the ink layer can be appropriately prepared by, in addition to such a printing method or coating method, combining a plurality of well-known methods, for example, a printing method, such as gravure direct printing, gravure offset printing, or screen printing; and a coating method, such as gravure coating, roll coating, die coating, bar coating, knife coating, and extrusion coating; a lamination method; and a transfer method.

The product form of the laminate according to the present disclosure is not particularly limited, and may be, for example, a sheet product such as a sheet, a laminate product in which a plurality of sheets are laminated, or a roll body in which a sheet is wound into a roll shape.

The laminates provided with the plasticizer-containing layer and the ink layer of the present disclosure can exhibit excellent adhesion and low-temperature impact resistance.

The adhesion can be evaluated by a cross-cut test in accordance with JIS K 5600. The ink layer constituting the laminate of the present disclosure can achieve greater than or equal to 90/100, greater than or equal to 95/100, or greater than or equal to 97/100 and less than or equal to 99/100, or less than or equal to 100/100 in terms of the number of remaining grids in the test.

The low-temperature impact resistance can be evaluated by the Gardner impact test in accordance with ASTM D2794 in an environment at 5° C. The ink layer constituting the laminate of the present disclosure can achieve greater than or equal to approximately 30 inch-pounds, greater than or equal to approximately 35 inch-pounds, greater than or equal to approximately 40 inch-pounds, or greater than or equal to approximately 45 inch-pounds in the test. The upper limit thereof in the test is not particularly limited, and can be, for example, less than or equal to approximately 100 inch-pounds, or less than or equal to approximately 90 inch-pounds.

In some embodiments, the ink layer of the present disclosure is stretchable and the laminate provided with the ink layer can exhibit excellent elongation properties. Such elongation properties can be evaluated by, for example, the test of elongation at break described below. The ink layer of the laminate in some embodiments may exhibit an elongation at break of greater than or equal to approximately 80%, greater than or equal to approximately 100%, greater than or equal to approximately 120%, or greater than or equal to approximately 140% at 20° C. The upper limit of the elongation at break is not particularly limited, and can be, for example, less than or equal to approximately 240%, less than or equal to approximately 220%, less than or equal to approximately 200%, or less than or equal to approximately 190%. The term "break" as used herein refers to the case where an appearance change, such as a crack that is visible on the surface of the ink layer occurs, or the case where the film breaks before the appearance change of the ink layer occurs. A laminate having such elongation properties can be suitably used as a decorative film, for example.

Figure 3:
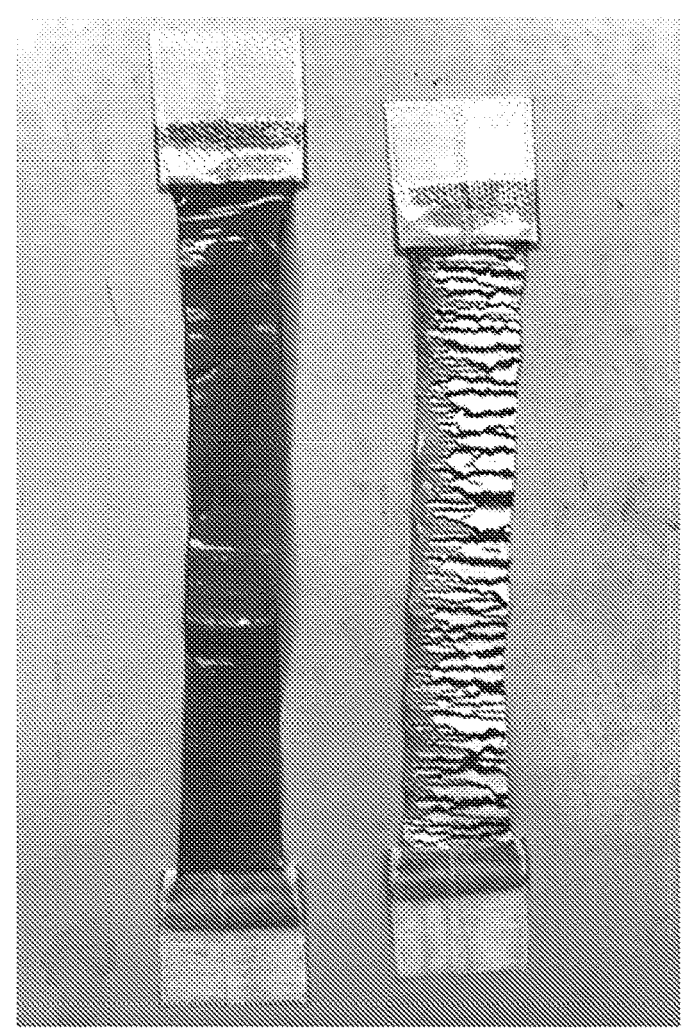
FIG. 3 includes a photograph on the left side showing after a laminate of Example 1 prepared by applying a radiation curable ink according to an embodiment of the present disclosure onto a vinyl chloride film where a plasticizer bleeds on its surface, is elongated by 130% at 70° C.; and a photograph on the right side showing after a laminate of Comparative Example 1 prepared by applying a known radiation curable ink onto a vinyl chloride film where a plasticizer bleeds on its surface, is elongated by 80% at 70° C.
Figures 2A, 2B, 2C:
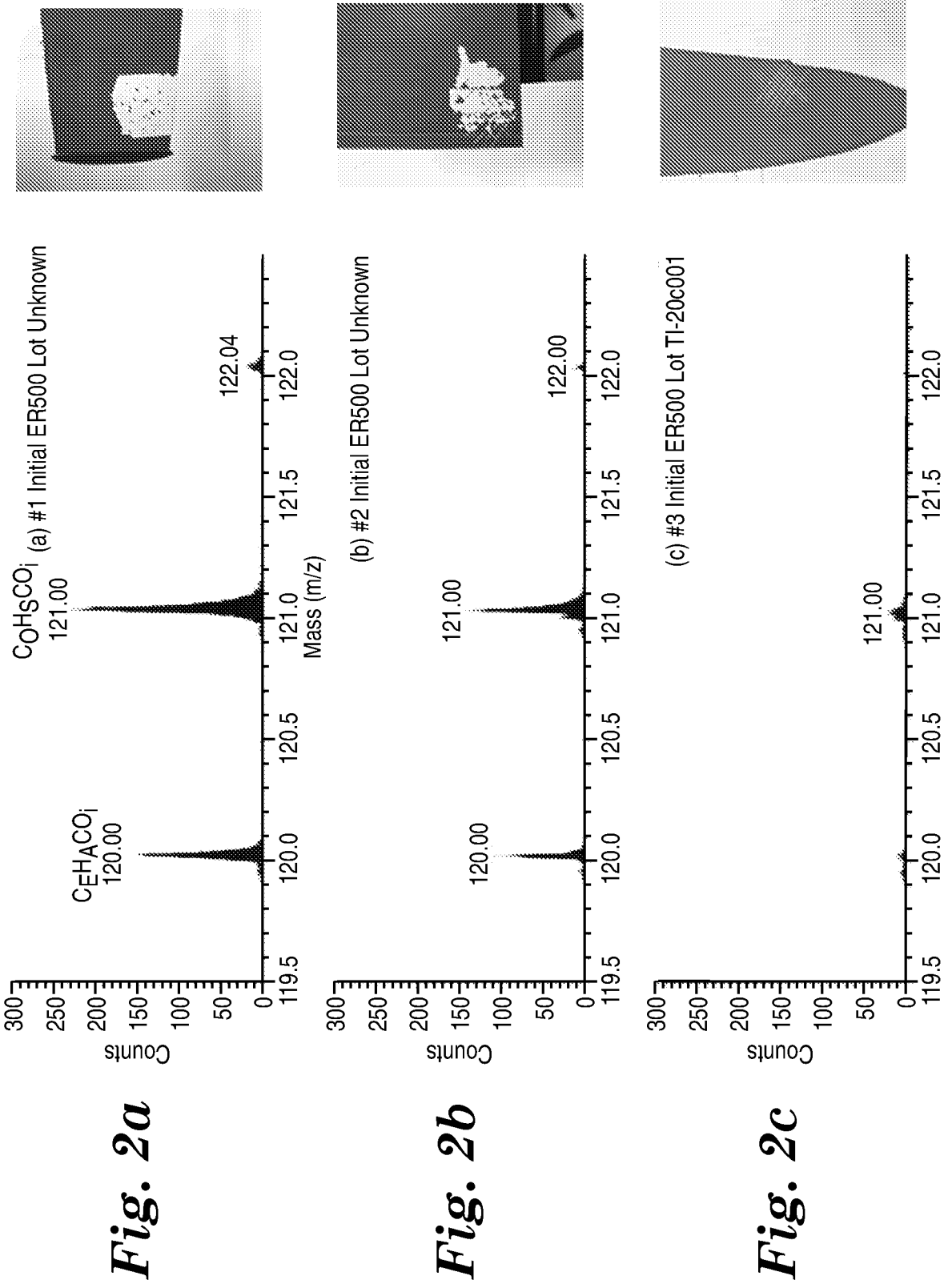
FIG. 2(a) is a photograph showing the state after adhesion testing of a laminate prepared by applying a known radiation curable ink onto a vinyl chloride film where a plasticizer highly bleeds on its surface.
FIG. 2(b) is a photograph showing the state after adhesion testing of a laminate prepared by applying a known radiation curable ink onto a vinyl chloride film where a plasticizer intermediately bleeds on its surface.
FIG. 2(c) is a photograph showing the state after adhesion testing of a laminate prepared by applying a known radiation curable ink onto a vinyl chloride film where a plasticizer less bleeds on its surface.

In some embodiments, the laminate provided with the ink layer of the present disclosure may exhibit excellent heat-stretching properties (FIG. 3). Such heat-stretching properties can be evaluated by, for example, a heat stretching test described below. The ink layer of the laminate in some embodiments may exhibit an elongation at break of greater than or equal to approximately 80%, greater than or equal to approximately 90%, or greater than or equal to approximately 100% at 70° C. The upper limit of the elongation at break is not particularly limited, and can be, for example, less than or equal to approximately 200%, less than or equal to approximately 180%, or less than or equal to approximately 160%, or less than or equal to approximately 150%. The term "break" as used herein refers to the case where an appearance change, such as a crack, that is visible on the surface of the ink layer occurs. A laminate having such elongation properties can be suitably used as a decorative film that may be processed using a thermoforming method, for example.

As the plasticizer-containing substrate to which the ink layer of the laminate used in each of the aforementioned tests is applied, a substrate in a state where the plasticizer has sufficiently bled to the surface of the substrate when stored for 6 months or longer in an environment at approximately 25° C., is used. When there is no substrate stored under such conditions, as an alternative means, a substrate obtained by allowing the plasticizer-containing substrate to stand for 24 hours in a constant-temperature bath at 80° C. and then allowing it to stand for 24 hours at ambient temperature can be adopted. The state where the plasticizer has sufficiently bled to the surface of the substrate can be confirmed by preparing the laminate in the same manner as in Comparative Example 1 described later and then performing the cross-cut test on the ink layer of the laminate, and when the number of remaining grids is less than or equal to 49/100, the substrate is considered to be in the state where the plasticizer has sufficiently bled to the surface of the substrate. When the number of remaining grids is not 49/100 or less, the aforementioned alternative means is repeatedly performed until the number of remaining grids becomes less than or equal to 49/100.

Application of the laminate of the present disclosure is not particularly limited. For example, the laminate of the present disclosure can be used in decorative applications. For example, the laminate of the present disclosure can be used as inner walls of structures such as buildings, apartments, and houses; interior materials such as stairs, windows, doors, floors, ceilings, columns, and partitions; or exterior materials such as outer walls, and can be used as various interior or exterior products, for example, interior or exterior products of vehicles, railroads, aircraft, ships, and the like. In addition, the laminate of the present disclosure can be used for electrical appliances, such as personal computers, smartphones, mobile phones, refrigerators, and air conditioners; stationery; furniture; desks; various containers, such as cans, road signs, and signboards; and the like.

EXAMPLES

In the following examples, specific embodiments of the present disclosure will be illustrated, but the present invention is not limited to these examples. All parts and percent are based on mass unless otherwise specified.

The raw materials used in the examples are shown in Table 1 below.

TABLE 1

| Trade name, model number or abbreviated name | Description | Available from |
| --- | --- | --- |
| ACMO | Acryloylmorpholine | KJ Chemicals Corporation |
| NVC | N-Vinyl-ε-caprolactam | BASF |
| VMOX | 5-Methyl-3-vinyl-1,3-oxazolidin-2-one | BASF |
| VIM | 1-Vinylimidazole | Tokyo Chemical Industry Co., Ltd. |
| CN991NS | Bifunctional urethane acrylate oligomer | Sartomer |
| CN929 | Trifunctional urethane acrylate oligomer | Sartomer |
| EBECRYL (trademark) 4740 | Trifunctional urethane acrylate oligomer | Daicel Allnex Ltd. |
| CN9006NS | Hexafunctional urethane acrylate oligomer | Sartomer |
| HDDA | 1.6-Hexanediol diacrylate | Osaka Organic Chemical Industry Ltd. |
| NOAA | n-Octyl acrylate | Osaka Organic Chemical Industry Ltd. |
| LA | Lauryl acrylate | Osaka Organic Chemical Industry Ltd. |
| HA | Hexyl acrylate | Tokyo Chemical Industry Co., Ltd. |
| HDA | Hexadecyl acrylate | Tokyo Chemical Industry Co., Ltd. |
| SA | Stearyl acrylate | Tokyo Chemical Industry Co., Ltd. |
| OVE | Octadecyl vinyl ether | Tokyo Chemical Industry Co., Ltd. |
| TMCHA | 3,3,5-Trimethylcyclohexyl acrylate | Osaka Organic Chemical Industry Ltd. |
| THFA | Tetrahydrofurfuryl acrylate | Osaka Organic Chemical Industry Ltd. |
| IDAA | Isodecyl acrylate | Osaka Organic Chemical Industry Ltd. |
| IOA | Isooctyl acrylate | 3M Japan Limited |
| 2EHA | 2-Ethylhexyl acrylate | Nippon Shokubai Co., Ltd. |
| Chivacure (trademark) TPO | Photopolymerization initiator: 2,4,6-Trimethylbenzoyldiphenyl phosphine oxide | Chitec Technology |
| SB-PI711 | Photopolymerization initiator: Methyl-o-benzoylbenzoate | Sanyo Trading Co., Ltd. |
| BZP | Photopolymerization initiator: Benzophenone | Shuang-Bang Industrial Corp. |
| ESACURE (trademark) ONE | Photopolymerization initiator: 2-Hydroxy-1-(4-isopropenylphenyl)-2-methylpropane-1-one oligomer | IGM Resins |
| P.R.122 | Red pigment | Cabot Corp. |
| 3M (trademark) Scotchcal (trademark) Graphic Film ER500 | Adipate-based plasticizer-containing polyvinyl chloride film, stored for 6 months or longer in an environment at about 25° C. | 3M Japan Limited |
| 3M (trademark) DI-NOC (trademark) Film PA389 | Adipate-based plasticizer-containing polyvinyl chloride film, stored for 6 months or longer in an environment at about 25° C. | 3M Japan Limited |
| 3M (trademark) Scotchcal (trademark) | Phthalate-based plasticizer (diisononyl phthalate)-containing | 3M Japan Limited |

TABLE 1-continued

| Trade name, model number or abbreviated name | Description | Available from |
| --- | --- | --- |
| Graphic Film IJ1220-10 | polyvinyl chloride film, stored for 6 months or longer in an environment at about 25° C. | |

Example 1

A liquid mixture containing 30.0 parts by mass of ACMO, 20.0 parts by mass of CN991NS, 26.8 parts by mass of NOAA, 5 parts by mass of Chivacure (trademark) TPO, and 5 parts by mass of SB-PI711 was prepared by mixing in a mixer for 20 minutes. Next, a pigment dispersion liquid prepared by blending 4 parts by mass of P. R. 122 with 23.2 parts by mass of TMCHA was added to the liquid mixture, and mixed for 20 minutes to prepare a radiation curable ink.

The radiation curable ink was bar-coated onto a substrate film (3M (trademark) Scotchcal (trademark) Graphic Film ER500) using a #7 wire bar to form an ink layer. The substrate film to which the ink layer had been applied was irradiated using a UV irradiator (H-valve (DRS model) of Fusion UV System Inc.) under an ambient (air) atmosphere to cure the ink layer. At this time, the ink layer was irradiated with ultraviolet rays (UV-A) under conditions of an irradiance of 1,000 mW/cm$^2$ and an integral of light of 600 mJ/cm$^2$. In this manner, a laminate having an approximately 10 micrometer-thick ink layer was prepared.

Examples 2 to 29

Laminates of Examples 2 to 29 were prepared in the same manner as in Example 1 except that the composition was changed to the composition shown in Table 2.

Comparative Examples 1 to 8

Laminates of Comparative Examples 1 to 8 were prepared in the same manner as in Example 1 except that the composition was changed to the composition shown in Table 3.

Physical property evaluation test 1

The properties of the laminates were evaluated using the following methods. The results are shown in Tables 2 to 6.

(Adhesion Test)

The adhesion performance between the substrate and the ink layer was evaluated by a cross-cut method in accordance with JIS K 5600 by the following criteria. Here, a 10×10 grid with 1 mm grid interval and Cellotape (trademark) CT-24 (available from Nichiban Co., Ltd.) were used. In addition, the number of remaining grids of the ink layer after the tape was peeled off was visually confirmed. Evaluations A to C are pass levels and evaluations D and E are fail levels:

A: 100/100

B: 95/100 to 99/100

C: 90/100 to 94/100

D: 50/100 to 89/100

E: 0/100 to 49/100

(Low-temperature Impact Resistance Test)

The low-temperature impact resistance was evaluated by the Gardner impact test in accordance with ASTM D2794 as follows.

Each laminate was cut into a size of approximately 150 mm in length and approximately 70 mm in width, and affixing the cut laminate onto an aluminum plate having a size of approximately 150 mm in length, approximately 70 mm in width, and approximately 1 mm in thickness at room temperature to prepare a test sample. After allowed to stand for 24 hours in an atmosphere at 5° C., the test sample was attached to an impact testing device (IG-1120, available from BYK-Gardner) such that the laminate side was on the upper surface. An iron ball weighing 2 pounds was dropped from a height of 5 to 40 inches above the surface of the laminate of the test sample. The appearance of the laminate was visually observed, and the maximum height at which defects such as cracks did not occur in the laminate was multiplied by 2 pounds of weight of the iron ball to calculate the impact force (inch-pounds). Here, when the impact force is greater than or equal to 30 inch-pounds, it is considered a pass level.

(Test of Elongation at Break)

Each laminate was cut into a size of approximately 100 mm (approximately 4 inches) in length and approximately 25 mm (approximately 1 inch) in width to prepare a test sample. The test sample was set on a tensile tester (TEN-SILON universal testing machine, model: RTC-1210A, available from A&D Company, Limited), and the elongation at the time when the ink layer of the test sample was broken under conditions of a pinching distance of 50 mm, a tensile rate of 300 mm/min, and 20° C., or at the time when the test sample was broken before the ink layer was broken was measured. The elongation at 20° C. was determined from Equation 1 below:

$$\text{(Length of ink layer or test sample at break--length of test sample before elongation)/(length of test sample before elongation)} \times 100\ (\%) \qquad \text{Equation 1}$$

(Heat Stretching Test)

Each laminate was cut into a size of approximately 100 mm (approximately 4 inches) in length and approximately 25 mm (approximately 1 inch) in width to prepare a test sample. The test sample was set on a tensile tester (TEN-SILON universal testing machine, model: RTC-1210A, available from A&D Company, Limited), and the elongation at the time when the ink layer of the test sample was broken under conditions of a pinching distance of 50 mm, a tensile rate of 50 mm/min, and 70° C. was measured. The elongation at was determined from Equation 2 below:

$$\text{(Length of test sample at break of ink layer--length of test sample before elongation)/(length of test sample before elongation)} \times 100\ (\%) \qquad \text{Equation 2}$$

TABLE 2

| Ink composition | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Component (A) | ACMO | 30.0 | — | — | 20.0 | 16.8 | 15.0 | 20.0 | 20.0 | 40.0 | 20.0 |
| | NVC | — | 30.0 | — | — | — | — | — | — | — | — |
| | VMOX | — | — | 30.0 | — | — | — | — | — | — | — |
| | VIM | — | — | — | — | — | — | — | — | — | — |
| Component (B) | CN991NS | 20.0 | 20.0 | 20.0 | 20.0 | 30.0 | 20.0 | 20.0 | 20.0 | 20.0 | — |
| | CN929 | — | — | — | — | — | — | — | — | — | — |
| | CN9006NS | — | — | — | — | — | — | — | — | — | — |
| | HDDA | — | — | — | — | — | — | — | — | — | 20.0 |
| Component (C) | NOAA | 26.8 | 26.8 | 26.8 | 20.0 | 20.0 | 20.0 | — | 40.0 | 20.0 | 20.0 |
| | LA | — | — | — | — | — | — | 20.0 | — | — | — |
| | HA | — | — | — | — | — | — | — | — | — | — |
| | HDA | — | — | — | — | — | — | — | — | — | — |
| | SA | — | — | — | — | — | — | — | — | — | — |
| | OVE | — | — | — | — | — | — | — | — | — | — |
| Component (D) | TMCHA | 23.2 | 23.2 | 23.2 | 30.0 | 23.2 | 35.0 | 30.0 | 10.0 | 10.0 | 30.0 |
| | THFA | — | — | — | 10.0 | 10.0 | 10.0 | 10.0 | 10.0 | 10.0 | 10.0 |
| Component (D) (Branched monofunctional monomer) | IDAA | — | — | — | — | — | — | — | — | — | — |
| | IOA | — | — | — | — | — | — | — | — | — | — |
| | 2EHA | — | — | — | — | — | — | — | — | — | — |
| Total of radiation curable resin components | | 100 | 100 | 100 | 100 | 100 | 100 | 100 | 100 | 100 | 100 |
| Chivacure (trademark) TPO | | 5 | 5 | 5 | 5 | 5 | 5 | 5 | 5 | 5 | 5 |
| SB-PI711 | | 5 | 5 | 5 | 5 | 5 | 5 | 5 | 5 | 5 | 5 |
| P.R.122 | | 4 | 4 | 4 | 4 | 4 | 4 | 4 | 1 | 1 | 4 |
| Rating | Adhesion | A | A | A | A | A | A | A | A | A | A |
| | Low-temperature impact resistance (inch-pounds) | 50 | 50 | 40 | 60 | 60 | 70 | 70 | 80 | 50 | 30 |
| | Elongation at 20° C. (%) | 187 | 171 | 163 | 183 | 154 | 179 | 169 | 170 | 167 | 58 |
| | Elongation at 70° C. (%) | 150 | 140 | 120 | 140 | 110 | 150 | 120 | 150 | 160 | 40 |

TABLE 3

| Ink composition | | Example 11 | Example 12 | Example 13 | Example 14 | Example 15 | Example 16 | Example 17 | Example 18 |
|---|---|---|---|---|---|---|---|---|---|
| Component (A) | ACMO | — | 50.0 | 20.0 | 20.0 | 20.0 | 20.0 | 20.0 | 20.0 |
| | NVC | — | — | — | — | — | — | — | — |
| | VMOX | — | — | — | — | — | — | — | — |
| | VIM | 30.0 | — | — | — | — | — | — | — |
| Component (B) | CN991NS | 20.0 | 20.0 | — | 10.0 | 15.0 | 15.0 | 18.0 | 20.0 |
| | CN929 | — | — | 20.0 | 10.0 | 5.0 | — | — | — |
| | CN9006NS | — | — | — | — | — | 5.0 | 2.0 | — |
| | HDDA | — | — | — | — | — | — | — | — |
| Component (C) | NOAA | 26.8 | 30.0 | 20.0 | 20.0 | 20.0 | 20.0 | 20.0 | — |
| | LA | — | — | — | — | — | — | — | — |
| | HA | — | — | — | — | — | — | — | 20.0 |
| | HDA | — | — | — | — | — | — | — | — |
| | SA | — | — | — | — | — | — | — | — |
| | OVE | — | — | — | — | — | — | — | — |
| Component (D) | TMCHA | 23.2 | — | 30.0 | 30.0 | 30.0 | 30.0 | 30.0 | 30.0 |
| | THFA | — | — | 10.0 | 10.0 | 10.0 | 10.0 | 10.0 | 10.0 |
| Component (D) (Branched monofunctional monomer) | IDAA | — | — | — | — | — | — | — | — |
| | IOA | — | — | — | — | — | — | — | — |
| | 2EHA | — | — | — | — | — | — | — | — |
| Total of radiation curable resin components | | 100 | 100 | 100 | 100 | 100 | 100 | 100 | 100 |
| Chivacure (trademark) TPO | | 5 | 5 | 5 | 5 | 5 | 5 | 5 | 5 |
| SB-PI711 | | 5 | 5 | 5 | 5 | 5 | 5 | 5 | 5 |
| P.R. 122 | | 4 | — | 4 | 4 | 4 | 4 | 4 | 4 |
| Rating | Adhesion | A | A | A | A | A | A | A | A |
| | Low-temperature impact resistance (inch-pounds) | 70 | 30 | 80 | 60 | 70 | 60 | 60 | 60 |
| | Elongation at 20° C. (%) | 175 | 178 | 159 | 163 | 170 | 112 | 150 | 182 |
| | Elongation at 70° C. (%) | 140 | 160 | 90 | 110 | 130 | 80 | 110 | 160 |

| Ink composition | | Example 19 | Example 20 | Example 21 | Example 22 | Example 23 | Example 24 |
|---|---|---|---|---|---|---|---|
| Component (A) | ACMO | 20.0 | 20.0 | 20.0 | 30.0 | 20.0 | 20.0 |
| | NVC | — | — | — | — | — | — |
| | VMOX | — | — | — | — | — | — |
| | VIM | — | — | — | — | — | — |
| Component (B) | CN991NS | 20.0 | 20.0 | 20.0 | 20.0 | 20.0 | 20.0 |
| | CN929 | — | — | — | — | — | — |
| | CN9006NS | — | — | — | — | — | — |
| | HDDA | — | — | — | — | — | — |
| Component (C) | NOAA | — | — | 10.0 | 50.0 | 15.0 | 20.0 |
| | LA | — | — | 10.0 | — | — | — |
| | HA | — | — | — | — | — | — |
| | HDA | 20.0 | — | — | — | — | — |
| | SA | — | 20.0 | — | — | — | — |
| | OVE | — | — | — | — | — | — |
| Component (D) | TMCHA | 30.0 | 30.0 | 30.0 | — | 30.0 | 30.0 |
| | THFA | 10.0 | 10.0 | 10.0 | — | 15.0 | — |
| Component (D) (Branched monofunctional monomer) | IDAA | — | — | — | — | — | 10 |
| | IOA | — | — | — | — | — | — |
| | 2EHA | — | — | — | — | — | — |
| Total of radiation curable resin components | | 100 | 100 | 100 | 100 | 100 | 100 |
| Chivacure (trademark) TPO | | 5 | 5 | 5 | 5 | 5 | 5 |
| SB-PI711 | | 5 | 5 | 5 | 5 | 5 | 5 |
| P.R. 122 | | 4 | 4 | 4 | — | 4 | 4 |
| Rating | Adhesion | A | A | A | C (90/100) | A | A |
| | Low-temperature impact resistance | 50 | 60 | 70 | 40 | 70 | 70 |

TABLE 3-continued

| | | | | | | |
|---|---|---|---|---|---|---|
| (inch-pounds) | | | | | | |
| Elongation at 20° C. (%) | 175 | 187 | 181 | 186 | 182 | 185 |
| Elongation at 70° C. (%) | 140 | 150 | 160 | 110 | 160 | 170 |

TABLE 4

| Ink composition | | Example 25 | Example 26 | Example 27 | Example 28 | Example 29 |
|---|---|---|---|---|---|---|
| Component (A) | ACMO | 25.0 | 25.0 | 25.0 | 20.0 | 20.0 |
| | NVC | 5.0 | — | — | — | — |
| | VMOX | — | 5.0 | — | — | — |
| | VIM | — | — | 5.0 | — | — |
| Component (B) | CN991NS | 20.0 | 20.0 | 20.0 | 20.0 | 20.0 |
| | CN929 | — | — | — | — | — |
| | CN9006NS | — | — | — | — | — |
| | HDDA | — | — | — | — | — |
| Component (C) | NOAA | 26.8 | 26.8 | 26.8 | — | 5 |
| | LA | — | — | — | — | — |
| | HA | — | — | — | — | — |
| | HDA | — | — | — | — | — |
| | SA | — | — | — | — | — |
| | OVE | — | — | — | 20 | — |
| Component (D) | TMCHA | 23.2 | 23.2 | 23.2 | 30.0 | 30.0 |
| | THFA | — | — | — | 10.0 | 10.0 |
| Component (D) | IDAA | — | — | — | — | 15 |
| (Branched | IOA | — | — | — | — | — |
| monofunctional | 2EHA | — | — | — | — | — |
| monomer) | | | | | | |
| Total of radiation curable resin components | | 100 | 100 | 100 | 100 | 100 |
| Chivacure (trademark) TPO | | 5 | 5 | 5 | 5 | 5 |
| SB-PI711 | | 5 | 5 | 5 | 5 | 5 |
| P.R.122 | | 4 | 4 | 4 | 4 | 4 |
| Rating | Adhesion | A | A | A | A | A |
| | Low-temperature impact resistance (inch-pounds) | 60 | 60 | 70 | 80 | 70 |
| | Elongation at 20° C. (%) | 182 | 169 | 177 | 224 | 180 |
| | Elongation at 70° C. (%) | 150 | 150 | 160 | 220 | 140 |

45

TABLE 5

| Ink composition | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Component (A) | ACMO | — | 10.0 | 20.0 | 20.0 | 20.0 | 20.0 | 20.0 | 20.0 |
| | NVC | — | — | — | — | — | — | — | — |
| | VMOX | — | — | — | — | — | — | — | — |
| | VIM | — | — | — | — | — | — | — | — |
| Component (B) | CN991NS | 23.2 | 20.0 | — | 15.0 | 20.0 | 20.0 | 20.0 | 20.0 |
| | CN929 | — | — | — | — | — | — | — | — |
| | CN9006NS | — | — | — | — | — | — | — | — |
| | HDDA | — | — | — | — | — | — | — | — |
| Component (C) | NOAA | 20.0 | 20.0 | 20.0 | 20.0 | — | — | — | — |
| | LA | — | — | — | — | — | — | — | — |
| | HA | — | — | — | — | — | — | — | — |
| | HDA | — | — | — | — | — | — | — | — |
| | SA | — | — | — | — | — | — | — | — |
| | OVE | — | — | — | — | — | — | — | — |
| Component (D) | TMCHA | 56.8 | 40.0 | 50.0 | 35.0 | 50.0 | 30.0 | 30.0 | 30.0 |
| | THFA | — | 10.0 | 10.0 | 10.0 | 10.0 | 10.0 | 10.0 | 10.0 |
| Component | IDAA | — | — | — | — | — | 20.0 | — | — |

TABLE 5-continued

| Ink composition | | Com- parative Example 1 | Com- parative Example 2 | Com- parative Example 3 | Com- parative Example 4 | Com- parative Example 5 | Com- parative Example 6 | Com- parative Example 7 | Com- parative Example 8 |
|---|---|---|---|---|---|---|---|---|---|
| (D) | IOA | — | — | — | — | — | — | 20.0 | — |
| (Branched monofunctional monomer) | 2EHA | — | — | — | — | — | — | — | 20.0 |
| Total of radiation curable resin components | | 100 | 100 | 100 | 100 | 100 | 100 | 100 | 100 |
| Chivacure (trademark) TPO | | 5 | 5 | 5 | 5 | 5 | 5 | 5 | 5 |
| SB-PI711 | | 5 | 5 | 5 | 5 | 5 | 5 | 5 | 5 |
| P.R.122 | | 4 | 4 | 4 | 4 | 4 | 4 | 4 | 4 |
| Rating | Adhesion | E (12/100) | E (26/100) | E (0/100) | A | B (99/100) | A | A | A |
| | Low- temperature impact resistance (inch- pounds) | 50 | 50 | 10 | 10 | 10 | 20 | 20 | 20 |
| | Elongation at 20° C. (%) | 192 | 150 | 220 | 202 | 154 | 116 | 175 | 179 |
| | Elongation at 70° C. (%) | 80 | 110 | More than 200 | 190 | 180 | 120 | 140 | 150 |

Example 30

The laminate of Example 30 was prepared in the same manner as in Example 1 except that the substrate film was changed to 3M (trademark) DI-NOC (trademark) Film PA389.

Comparative Example 9

The laminate of Comparative Example 9 was prepared in the same manner as in Example 1 except that the substrate film was changed to 3M (trademark) DI-NOC (trademark) Film PA389.

Example 31

The laminate of Example 31 was prepared in the same manner as in Example 1 except that the substrate film was changed to 3M (trademark) Scotchcal (trademark) Graphic Film IJ1220-10.

Comparative Example 10

The laminate of Comparative Example 10 was prepared in the same manner as in Comparative Example 1 except that the substrate film was changed to 3M (trademark) Scotchcal (trademark) Graphic Film IJ1220-10.

Example 32

A liquid mixture containing 20.0 parts by mass of ACMO, 25.0 parts by mass of CN991NS, 20.0 parts by mass of NOAA, 35.0 parts by mass of TMCHA, 5 parts by mass of BZP, and 5 parts by mass of ESACURE (trademark) ONE was mixed in a mixer for 30 minutes to prepare a radiation curable ink.

The radiation curable ink was bar-coated onto a substrate film (3M (trademark) Scotchcal (trademark) Graphic Film ER500) using a #2 wire bar to form an ink layer. The substrate film to which the ink layer had been applied was irradiated using a UV irradiator (H-valve (DRS model) of Fusion UV System Inc.) under an ambient (air) atmosphere to cure the ink layer. At this time, the ink layer was irradiated with ultraviolet rays (UV-A) under conditions of an irradiance of 1,000 mW/cm$^2$ and an integral of light of 600 mJ/cm$^2$. In this manner, a laminate for a nail scratch test and a pencil hardness test, having an approximately 3 microm-eter-thick ink layer, was prepared.

A laminate for the adhesion testing, low-temperature impact resistance test, and elongation at break test having an approximately 30 micrometer-thick ink layer was prepared in the same manner, except that the wire bar was changed to #20.

Examples 33 to 37 and Comparative Example 11

Laminates of Examples 33 to 37 and Comparative Example 11 were prepared in the same manner as in

TABLE 6

| Rating | Example 1 | Comparative Example 1 | Example 30 | Comparative Example 9 | Example 31 | Comparative Example 10 |
|---|---|---|---|---|---|---|
| Adhesion | A | E (12/100) | A | E (35/100) | A | E (28/100) |
| Low-temperature impact resistance (inch-pounds) | 50 | 50 | 80 | 70 | 80 | 80 |

Example 32 except that the composition was changed to the composition shown in Table 7.

Physical property evaluation test 2

The properties of the laminate were evaluated by performing a viscosity evaluation test, a nail scratch test, and a pencil hardness test described below, in addition to the adhesion test, the low-temperature impact resistance test, and the elongation at break test described in the physical property evaluation test 1. The results are shown in Table 7.

(Viscosity Evaluation Test)

The viscosity of the ink was measured by a Discovery HR-2 (DHR-2) rheometer (available from TA Instruments) under conditions of a shear rate of sec$^{-1}$ using a 60 mm cone plate (available from TA Instruments) on a peltier plate at 60° C.

(Nail Scratch Test)

A test sample was placed on an aluminum plate with the ink layer side up, and thereafter, the test was performed by setting the nail of the index finger on the test sample at an angle of approximately 90° and quickly moving the nail to scratch the ink layer. The surface of the test sample after the test was visually observed, and the case where no appearance change such as a scratch occurred was evaluated as "good", and the case where an appearance change occurred was evaluated as "poor".

(Pencil Hardness Test)

A test sample was fixed on an aluminum plate with the ink layer side up, and thereafter, the test was performed by scratching the surface of the ink layer at a rate of 600 mm/min with a load of 750 g applied to the tip of the core of the pencil in accordance with JIS K5600-5-4. The test sample was cured for 5 minutes in an environment at 60° C., and then judged. A pencil hardness of 2B or greater is considered a pass level.

Various variations of the above embodiments and examples will be apparent to those skilled in the art without departing from the basic principle of the present invention. In addition, various modifications and variations of the present invention will be apparent to those skilled in the art without departing from the spirit and scope of the present invention.

The invention claimed is:

1. A laminate comprising a plasticizer-containing layer; and an ink layer comprising a cured product of a radiation curable ink, the radiation curable ink comprising (A) a radiation curable polymerizable monomer having a (meth)acryloyl group and a nitrogen-containing heterocyclic structure; (B) at least one type selected from the group consisting of i) a radiation curable polymerizable polyfunctional (meth)acrylate oligomer and ii) a radiation curable polymerizable polyfunctional (meth)acrylate monomer; and (C) at least one type selected from the group consisting of i) a radiation curable polymerizable monofunctional (meth)acrylate monomer having a linear alkyl group and ii) a radiation curable polymerizable monofunctional vinyl monomer having a linear alkyl group, wherein a content of the component (A) is greater than 10 parts by mass based on 100 parts by mass of the radiation curable resin component;

a content of the component (B) is greater than 15 parts by mass based on 100 parts by mass of the radiation curable resin component, and a content of the component (C) is greater than or equal to 1 part by mass based on 100 parts by mass of the radiation curable resin component.

2. The laminate according to claim 1, comprising a bifunctional urethane (meth)acrylate oligomer as the component (B).

TABLE 7

| Ink composition | | Example 32 | Example 33 | Example 34 | Example 35 | Example 36 | Example 37 | Comparative Example 11 |
|---|---|---|---|---|---|---|---|---|
| Component (A) | ACMO | 20.0 | 20.0 | 20.0 | 20.0 | 20.0 | 20.0 | 20.0 |
| Component (B) | CN991NS (bifunctional) | 25.0 | 15.0 | 10.0 | — | — | 20.0 | — |
| | CN929 (trifunctional) | — | 10.0 | 10.0 | 20.0 | — | 5.0 | 15.0 |
| | EBECRYL (trademark) 4740 (trifunctional) | — | — | — | — | 20.0 | — | — |
| Component (C) | NOAA | 20.0 | 20.0 | 20.0 | 20.0 | 20.0 | 20.0 | 20.0 |
| Component (D) | TMCHA | 35.0 | 35.0 | 30.0 | 30.0 | 30.0 | 35.0 | 45.0 |
| | THFA | — | — | 10.0 | 10.0 | 10.0 | — | — |
| Total of radiation curable resin components | | 100 | 100 | 100 | 100 | 100 | 100 | 100 |
| BZP | | 5 | 5 | 5 | 5 | 5 | 5 | 5 |
| ESACURE (trademark) ONE | | 5 | 5 | 5 | 5 | 5 | 5 | 5 |
| Rating | Viscosity (mPa · s) | 7.2 | 8.4 | 6.5 | 7.3 | 5.3 | 7.6 | 5.6 |
| | Adhesion | A | A | A | A | A | A | A |
| | Low-temperature impact resistance (inch-pounds) | 40 | 80 | 70 | 70 | 70 | 40 | 10 |
| | Elongation at 20° C. (%) | 159 | 148 | 153 | 141 | 119 | 136 | 144 |
| | Nail scratch test | Poor | Good | Good | Good | Good | Good | Poor |
| | Pencil Hardness Test | 4B | 2B | 2B | 2B | 2B | 2B | 4B |

3. The laminate according to claim 1, comprising a trifunctional urethane (meth)acrylate oligomer as the component (B).

4. The laminate according to claim 1, wherein the number of carbon atoms in the linear alkyl group is greater than or equal to 6.

5. The laminate according to claim 1, wherein the component (A) is at least one type selected from the group consisting of (meth)acryloyl morpholine, N-vinyl-ε-caprolactam, 5-methyl-3-vinyl-1,3-oxazolidin-2-one, and 1-vinylimidazole.

6. The laminate according to claim 1, wherein a plasticizer in the plasticizer-containing layer is at least one type selected from the group consisting of adipic acid-based plasticizer and phthalic acid-based plasticizer.

\* \* \* \* \*